(12) United States Patent
Dooley et al.

(10) Patent No.: US 8,760,847 B2
(45) Date of Patent: Jun. 24, 2014

(54) LOW INDUCTANCE CAPACITOR ASSEMBLY

(75) Inventors: Kevin Allan Dooley, Mississauga (CA); Joshua Bell, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 259 days.

(21) Appl. No.: 12/956,111

(22) Filed: Nov. 30, 2010

(65) Prior Publication Data

US 2012/0134069 A1  May 31, 2012

(51) Int. Cl.
*H01G 4/38* (2006.01)
(52) U.S. Cl.
USPC .......................................... 361/328; 361/330
(58) Field of Classification Search
None
See application file for complete search history.

(56) References Cited

U.S. PATENT DOCUMENTS

| | | | |
|---|---|---|---|
| 2,824,264 A | 2/1958 | Anastopoulos | |
| 3,617,830 A | 11/1971 | Perna, Jr. | |
| 3,689,809 A | 9/1972 | McDonald et al. | |
| 3,921,039 A | 11/1975 | Robinson et al. | |
| 4,312,026 A | 1/1982 | Iwaya et al. | |
| 4,349,862 A | 9/1982 | Bajorek et al. | |
| 4,748,537 A | 5/1988 | Hernandez et al. | |
| 5,367,437 A * | 11/1994 | Anderson | 361/807 |
| 5,579,217 A | 11/1996 | Deam et al. | |
| 5,694,301 A | 12/1997 | Donegan et al. | |
| 5,777,377 A | 7/1998 | Gilmore | |
| 5,817,533 A | 10/1998 | Sen et al. | |
| 5,933,317 A | 8/1999 | Moncrieff | |
| 5,940,263 A | 8/1999 | Jakoubovitch | |
| 5,973,906 A | 10/1999 | Stevenson et al. | |
| 6,473,291 B1 | 10/2002 | Stevenson | |
| 6,516,504 B2 | 2/2003 | Schaper | |
| 6,577,490 B2 | 6/2003 | Ogawa et al. | |
| 6,753,218 B2 | 6/2004 | Devoe et al. | |
| 6,879,493 B2 | 4/2005 | Kimura et al. | |
| 7,149,072 B2 | 12/2006 | Lee et al. | |
| 7,251,121 B2 | 7/2007 | Bhutta | |
| 7,463,474 B2 | 12/2008 | Ritter et al. | |
| 7,477,505 B2 | 1/2009 | Timmerman et al. | |

(Continued)

FOREIGN PATENT DOCUMENTS

| | | |
|---|---|---|
| JP | 11026291 | 2/1999 |
| JP | 2000195754 | 7/2000 |

OTHER PUBLICATIONS

The Impact of High Energy Density Capacitors with Metallized Electrode in Large Capacitor Banks for Nuclear Fusion Applications; D.W. Larson et al; Ninth IEEE International Pulsed Power Conference [Online] 1993, vol. 2, pp. 735-738.

(Continued)

*Primary Examiner* — Eric Thomas
*Assistant Examiner* — Dion Ferguson
(74) *Attorney, Agent, or Firm* — Norton Rose Fulbright Canada LLP

(57) ABSTRACT

A low-inductance capacitor assembly (12) is provided. The capacitor assembly (12) includes a positive terminal plate (16), a negative terminal plate (18) and an array (20) of capacitors (22) disposed between and electrically coupled to the positive terminal plate (16) and the negative terminal plate (18). A passage (30) extends through the positive terminal plate (16), the negative terminal plate (18) and through a void (35) formed within the array (20) of capacitors (22). The passage (30) may allow routing of a conductor (14) through the capacitor assembly (12).

21 Claims, 5 Drawing Sheets

(56) References Cited

U.S. PATENT DOCUMENTS

| | | | |
|---|---|---|---|
| 7,499,258 B2 | 3/2009 | Shim et al. | |
| 7,580,245 B2* | 8/2009 | Inoue et al. | 361/522 |
| 7,685,703 B1 | 3/2010 | Devoe et al. | |
| 2002/0048139 A1* | 4/2002 | Meadows et al. | 361/302 |
| 2003/0133251 A1* | 7/2003 | Kitagawa et al. | 361/328 |
| 2007/0195485 A1* | 8/2007 | Erhardt et al. | 361/328 |
| 2007/0253146 A1* | 11/2007 | Inoue et al. | 361/328 |

OTHER PUBLICATIONS

Chandi: 160-KJ Capacitor Bank for Plasma Applications; Shukla et al; IEEE International Conference on Plasma Science [Online] 2005, pp. 241.

SMPS Stacked MLC Capacitors; SMX Style for High Temperature Applications up to 200C; 68976 AP Catalog New: AP Catalog; AVX Online; pp. 32-35.

* cited by examiner

LOW INDUCTANCE CAPACITOR ASSEMBLY

TECHNICAL FIELD

The disclosure relates generally to capacitors, and more particularly to low-inductance capacitor assemblies.

BACKGROUND OF THE ART

Power switching circuits are used in aerospace applications, including in electrical motor drives for starter/generators as parts of gas turbine engines. For optimal control of switching speeds and pulse rise times, it can be important to reduce or otherwise control the inductance associated with capacitors. In addition, conventional capacitors typically used in high-power switching circuits are relatively bulky and require relatively large packaging envelopes.

In aerospace applications, the smallest possible envelope for equipment is nearly always desired, in order to reduce weight and drag of the overall vehicle. Other design objectives for equipment onboard aircraft include increasing reliability while reducing size, weight and cost.

Improvement in packaging, and control of switching speeds and pulse rise times of low-inductance capacitors and capacitor assemblies is therefore desirable.

SUMMARY

The disclosure describes capacitors, and in particular low-inductance capacitors and capacitor assemblies.

Thus, in one aspect, the disclosure provides a capacitor assembly which may comprise: a positive terminal plate and a negative terminal plate; an array of capacitors disposed between and electrically coupled to the positive terminal plate and the negative terminal plate; and at least one passage extending through the positive terminal plate, the negative terminal plate and through a void formed within the array of capacitors.

In another aspect, the disclosure provides a capacitor installation which may comprise: a first terminal plate having a first opening and a second terminal plate having a second opening; an array of capacitors disposed between and electrically coupled to the first terminal plate and the second terminal plate, the array of capacitors forming a void cooperating with the first opening and the second opening to form a passage; and a conductor or other system component extending through the passage.

In a further aspect, the disclosure provides a capacitor assembly which may comprise: a positive terminal plate and a negative terminal plate; a non-conductive matrix disposed between the positive plate and the negative plate, the matrix comprising a plurality of through sockets; and a plurality of capacitors inserted in respective sockets within the matrix, the capacitors being electrically coupled to the positive terminal plate and the negative terminal plate.

In a further aspect, the disclosure provides a method of assembling a capacitor assembly. The method may comprise: disposing an array of capacitors between a positive terminal plate and a negative terminal plate, the array of capacitors including a void cooperating with a first opening in the positive plate and a second opening in the negative plate to form a passage; electrically coupling the capacitors with the positive terminal plate and the negative terminal plate; and mechanically securing the capacitors between the positive terminal plate and the negative terminal plate.

In a further aspect, the disclosure provides a method of assembling a capacitor assembly. The method may comprise: positioning a plurality of capacitors in respective sockets formed within a non-conductive matrix; and electrically coupling the capacitors to a positive terminal plate and to a negative terminal plate.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF EMBODIMENTS

Various aspects of embodiments of the disclosure are described through reference to the drawings.

Figure 1:
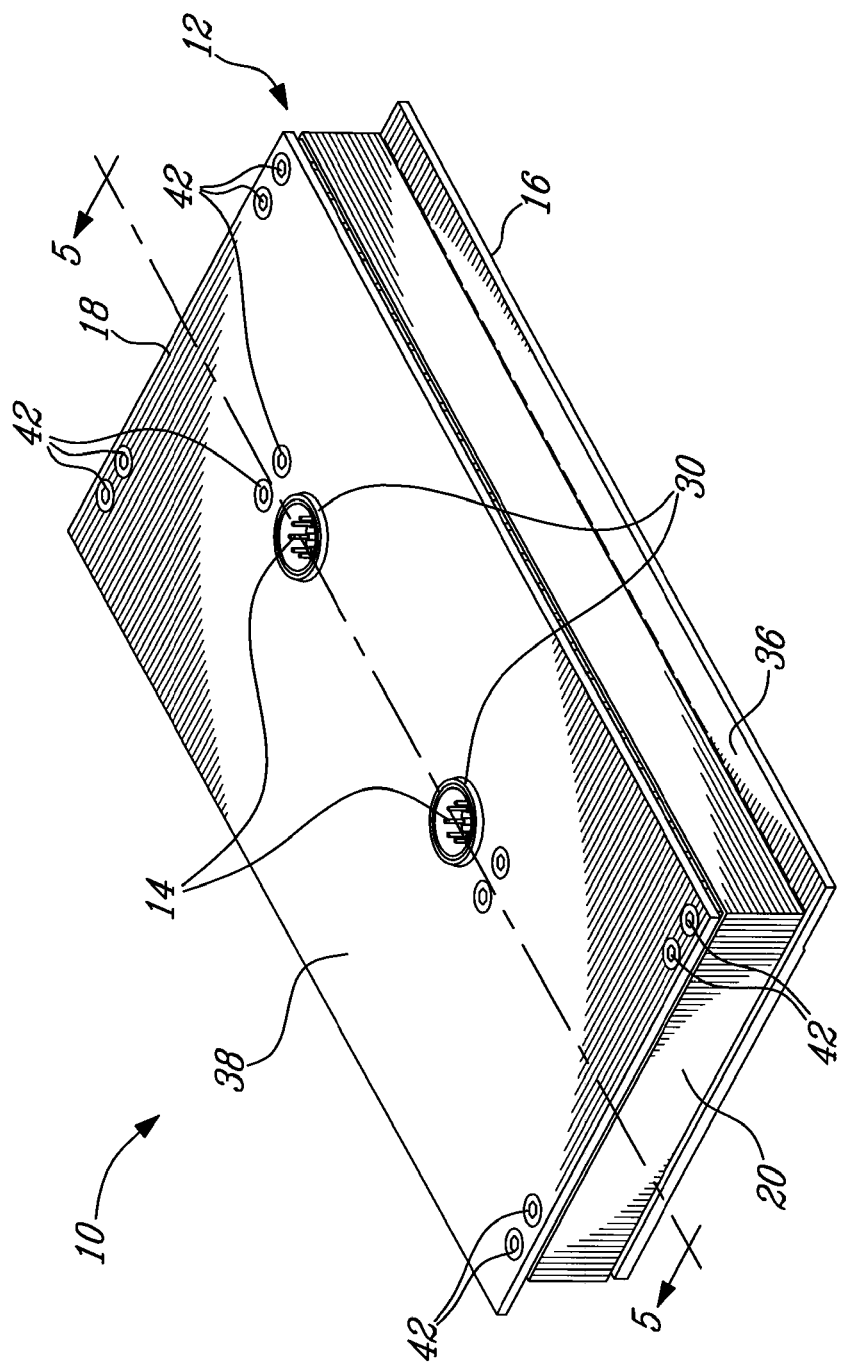
FIG. 1 shows a perspective view of a capacitor installation, including a capacitor assembly, in accordance with an embodiment disclosed herein.

FIG. 1 illustrates a low-inductance capacitor installation 10 in accordance with the disclosure herein. Capacitor installation 10 comprises capacitor assembly 12, and conductor or other structure or component 14 extending through capacitor assembly 12. Capacitor installation(s) 10 may for example be secured to a circuit board and/or other electrical or electronic component(s) such as an associated power bus (not shown). Capacitor installation(s) 10 may be used, for example, in applications where a high current and a low inductance are required. For example, capacitor installation 10 may be used in a direct current (DC) link circuit of a motor drive, switched power circuitry such as DC-DC converters, and/or inverters and high frequency motor drives. Capacitor installation(s) 10 may also be used in motor drive circuitry for a starter-generator of a gas turbine engine in an aircraft application.

Figure 2:
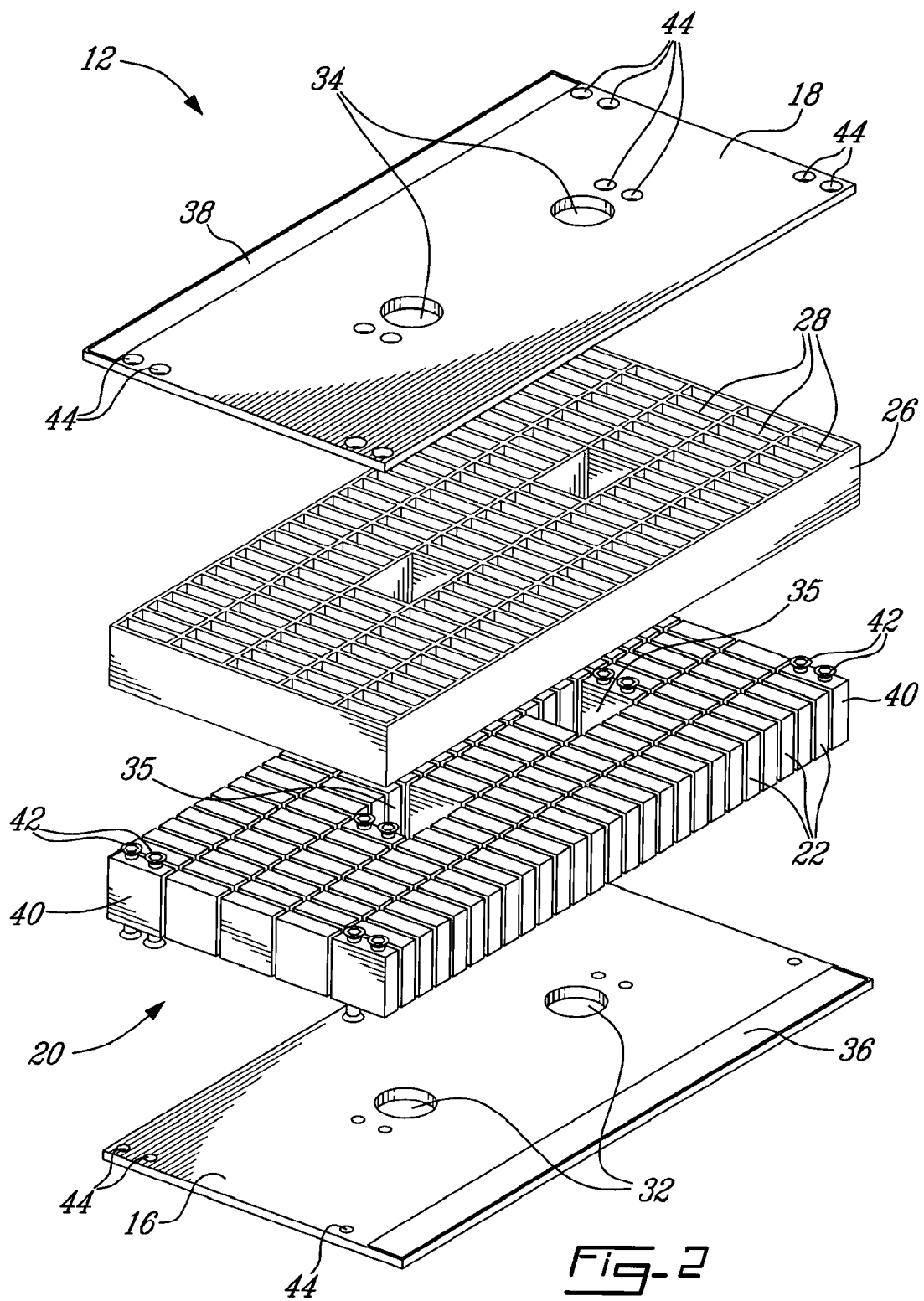
FIG. 2 is a perspective exploded view of the capacitor assembly of FIG. 1.

Capacitor assembly 12 may comprise a plurality of terminal plates, such as for example first (e.g., positive) terminal plate 16, second (e.g., negative) terminal plate 18; and one or more capacitor arrays 20, each composed of a plurality of capacitors 22, disposed between positive the plates 16, 18. Array(s) 20 of capacitors 22 (see, e.g., FIG. 2) may be disposed in any desired or otherwise suitable arrangement(s) to accommodate systems configuration, co-location, installation, etc. Array(s) 20 may be of one, two, or in appropriate circumstances three dimensions. For example, as shown in FIGS. 1 and 2, a two-dimensional array 20 may comprise a plurality of capacitors 22 disposed in rectangular, circular or any other suitable or otherwise desired regular or irregular two-dimensional configuration(s). Array(s) 20 may be one-dimensional and may comprise a plurality of capacitors 22 arranged in a single row (e.g., along a line). Array(s) 20 may be two-dimensional and comprise two or more rows of capacitors 22 disposed side-by-side. Array 20 may not necessarily be planar such that some of capacitors 22 may have different elevations to accommodate various shapes (e.g. contours) of terminal plates 16, 18.

Array(s) 20 may also be provided in three-dimensional arrays wherein, for example, two or more two-dimensional arrays 20 may be superimposed (e.g., stacked) between terminal plates 16 and 18. In this arrangement, the two or more two-dimensional arrays 20 could be separated by shared, common terminal plate(s), or may stacked with distinct, or separated terminal plates separated by, for example, sheets or other forms of insulating materials.

The shape(s) of terminal plates 16, 18 and/or array(s) 20 may be selected or otherwise determined to accommodate a wide range of installation/space constraints, and may for example one or more comprise cutouts 30 to avoid interfering with proximate or through-disposed components of the same or other systems. Accordingly, capacitor assembly(ies) 12 may provide a relatively simple and flexible packaging option for providing a large number of capacitors 22 having a relatively large capacitance and excellent response characteristics within a relatively small space. For example, capacitor assembly(ies) 12 may be positioned in relatively close proximity to associated components and circuitry such as switching devices.

Terminal plates 16 and 18 may be substantially planar or may have one or more planar region(s). Alternatively or in addition, terminal plates 16 and 18 may have one- or two-dimensional curved or rounded region(s) to accommodate installation constraints. Terminal plates 16 and 18 may comprise any suitable conductive material(s) such as, for example, aluminum-based material and/or copper-based material.

Each capacitor 22 within an array 20 may be electrically coupled to a positive terminal plate 16 and a negative terminal plate 18. Electrical coupling of capacitors 22 with positive terminal plate(s) 16 and/or negative terminal plate(s) 18 may be achieved through the application of an electrically-conductive epoxy such as a silver-based epoxy. Alternatively or in addition, capacitor(s) 22 may be electrically coupled to terminal plate(s) 16 and/or 18 by soldering, or by using any other suitable method(s) and/or device(s) for producing electrical connections.

Conductive epoxy(ies) or other form of electrical coupling(s) between capacitor(s) 22 and plate(s) 16, 18 may provide structural support and/or stiffening. For example, such coupling mechanisms may provide support for capacitors 22 between terminal plates 16 and 18. Coupling of capacitor(s) 22 directly to terminal plate(s) 16, 18 may allow capacitor assembly(ies) 12 to have relatively low inductance(s). The use of electrically-conductive epoxy(ies) may also allow (i.e. compensate) for dimensional variations, within a certain range, of capacitors 22.

A desired capacitance value of a capacitor assembly 12 may be achieved by the selection of an appropriate number and value of capacitors 22 within a capacitor assembly 12. The use of a plurality of capacitors 22 in a parallel arrangement can allow a capacitor assembly 12 to be used in high current and/or high-frequency applications.

Capacitors 22 may comprise a plurality of pre-fabricated chip capacitors of dielectric type such as, for example, ceramic or plastic film chip capacitors. Any suitable type(s) of chip capacitor(s) 22 could be used. Capacitors 22 within an array 20 may all have substantially identical capacitances and therefore the total capacitance of capacitor assembly 22 may be a multiple of the capacitance of one capacitor 22. Alternatively, it may be appropriate to mix capacitors 22 of different types and/or capacitances within capacitor assembly(ies) 12 to obtain specific characteristics and/or behavior of capacitor assembly(ies) 12.

Capacitor assembly(ies) 12 may also have favorable heat dissipation characteristics. For example, terminal plates 16 and/or 18 may comprise material(s) of relatively good electrical and thermal conductivity. The geometric configuration of terminal plates 16 and 18 may be selected to provide a relatively large surface area through which heat may be dissipated. Suitable heat-dissipation means such as, for example, cooling fin(s) may also be incorporated into or otherwise thermally connected to at least one of terminal plates 16 and 18 to further increase heat dissipation by convection if desired.

FIG. 2 illustrates an exploded view of a low-inductance capacitor assembly 12 such as that shown in FIG. 1. Individual capacitors 22 within an array 20 may be disposed within matrix 26. Matrix 26 may comprise a frame-like member including a plurality of through sockets 28 into which capacitors 22 may be inserted. Matrix 26 may comprise electrically and/or thermally non-conductive material(s) such as, for example, suitable light-weight polymeric material(s), composite material(s) and/or electrically and/or thermally insulated metal(s). Depending of the type(s) of material selected, matrix(ces) 26 may provide fire resistant and/or heat resistant barrier(s) between adjacent capacitors 22.

Matrix(ces) 26 may be useful, for example, when assembling a capacitor assembly 12 and may also facilitate the automated assembly/positioning of a capacitor assembly 12. Accordingly, matrix 26 may serve as a support frame for positioning individual capacitors 22 during an automated operation using, for example, vibrator technology for filling matrix 26 with capacitors 22. A matrix 26 may also serve as an electrical insulator between adjacent capacitors 22. A matrix 26 may also isolate capacitors 22 within array 20 from each other and, for example, prevent an exploding capacitor 22 from damaging adjacent capacitors 22.

A capacitor assembly 12 may comprise one or more passages 30 extending through capacitor assembly 12. Passage(s) 30 may for example comprise an opening 32 in a positive plate 16, opening 34 in a negative plate 18, and cooperating void(s) 35 within an array 20. Passage(s) 30 may be located within a periphery of a capacitor assembly 12 such that, for example, one or more individual capacitors 22 are disposed so as to encircle a structure 14 and thereby allow the structure 14 to pass through the array 20 while maintaining advantages of the multiple-capacitor array. For example, passage(s) 30 may be located within a generally central region of a positive terminal plate 16 and a negative terminal plate 18. Accordingly, passage(s) 30 may extend through array 20, for example, inside a periphery of array 20. Void(s) 35 may each correspond to a location within array 20 where at least one capacitor 22 has been omitted.

Accordingly, depending on the configuration of array 20 and the number of capacitors 22 within array 20, void(s) 35 may be surrounded by neighboring capacitors 22 within array 20. Openings 32 and 34 and void 35 may be substantially aligned to form a substantially straight (e.g. orthogonal or oblique relative to terminal plates 16 and/or 18) passage through capacitor assembly 12. Alternatively, openings 32 and 34 and void(s) 35 may be, for example, relatively positioned offset from each other to form a curved passage 30 for routing flexible cabling through capacitor assembly 12. Passage(s) 30 may allow the routing of structure 14, which may for example include various forms of wiring, cabling, conduit, fasteners, connector, other system component, etc. through capacitor assembly 12.

Capacitor assembly(ies) 12 may used in applications where low inductance and high power is desirable. Accordingly, capacitor 12 may be used in high frequency, high efficiency switching applications. For example, capacitor assembly 12 may be used in power switching circuitry in high-power motors such as starter/generators in gas turbine applications. The packaging flexibility of a capacitor assembly 12 in accordance with the disclosure may allow for the shape/configuration of capacitor assembly 12 to be selected based on the space available for installation.

Capacitor assembly 12 may be mechanically and electrically connected to an associated power bus or other electrical/electronic components or conductors via a positive connection 36 on a positive terminal plate 16 and/or a negative connection 38 on a negative terminal plate 18 without intermediate conductor(s) which could potentially increase impedance. Either or both of positive and negative connections 36, 38 may comprise a contact area along an edge of positive terminal plate 16 and on negative terminal plate 18 respectively. Positive and/or negative connections 36, 38 may comprise mounting holes (not shown) for securing a capacitor assembly 12 to an associated power bus using suitable threaded or other types of fasteners and/or using one or more clamps (not shown). Alternatively or additionally, positive and/or negative connections 36, 38 may be mechanically and/or electrically connected to associated bus work by soldering or by using any other suitable method(s) and/or device(s) of producing electrical connections. For example, a capacitor assembly 12 may be used in a gate drive circuit and positioned adjacent to or immediately above a switching device such as a metal oxide semiconductor field effect transistor (MOSFET) (not shown). Accordingly, conductor(s) 14 may include one or more wires associated with the operation of the MOSFET.

Figure 3:
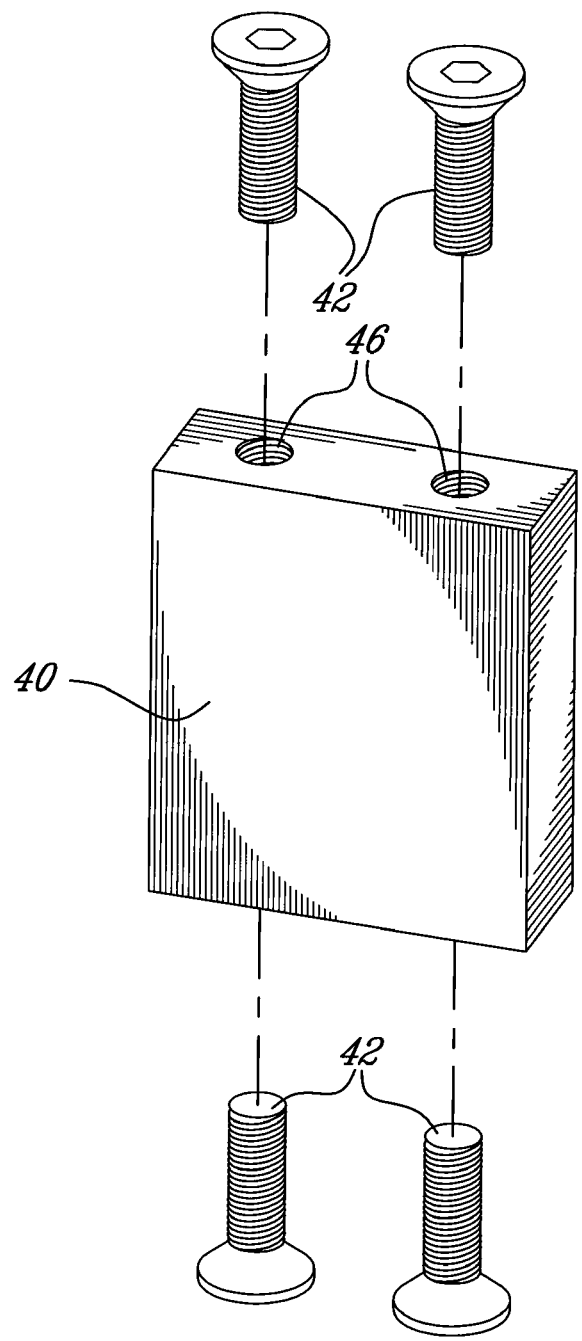
FIG. 3 is a perspective view of a mechanical connector from the capacitor assembly of FIG. 1.

FIG. 3 illustrates a mechanical connector 40 which may be used to secure an array 20 of capacitors 22 between, for example, a positive terminal plate 16 and a negative terminal plate 18 to provide structural support if required. A plurality of mechanical connectors 40 may be secured between plates 16, 18 using for example fasteners 42 extending through holes 44 in plates 16, 18 and threaded into corresponding threaded holes 46 in mechanical connectors 40. Any other suitable method(s) and device(s) could be used to secure mechanical connectors 40 between terminal plates 16, 18. Any suitable number of mechanical connectors 40 may be used to provide adequate support. In the embodiment shown, where array 20 is of rectangular shape, mechanical connectors 40 may for example be provided in each corner of array 20 as well as within a central region of array 20, for example, adjacent to passage(s) 30. The shape and size of each mechanical connector 40 may be substantially similar to that of capacitors 22 so that mechanical connectors 40 may also be contained within respective sockets 28 extending through matrix 26. Mechanical connectors 40 may comprise a non-conductive material with sufficient strength to provide adequate structural support within capacitor assembly 12.

Figure 4:
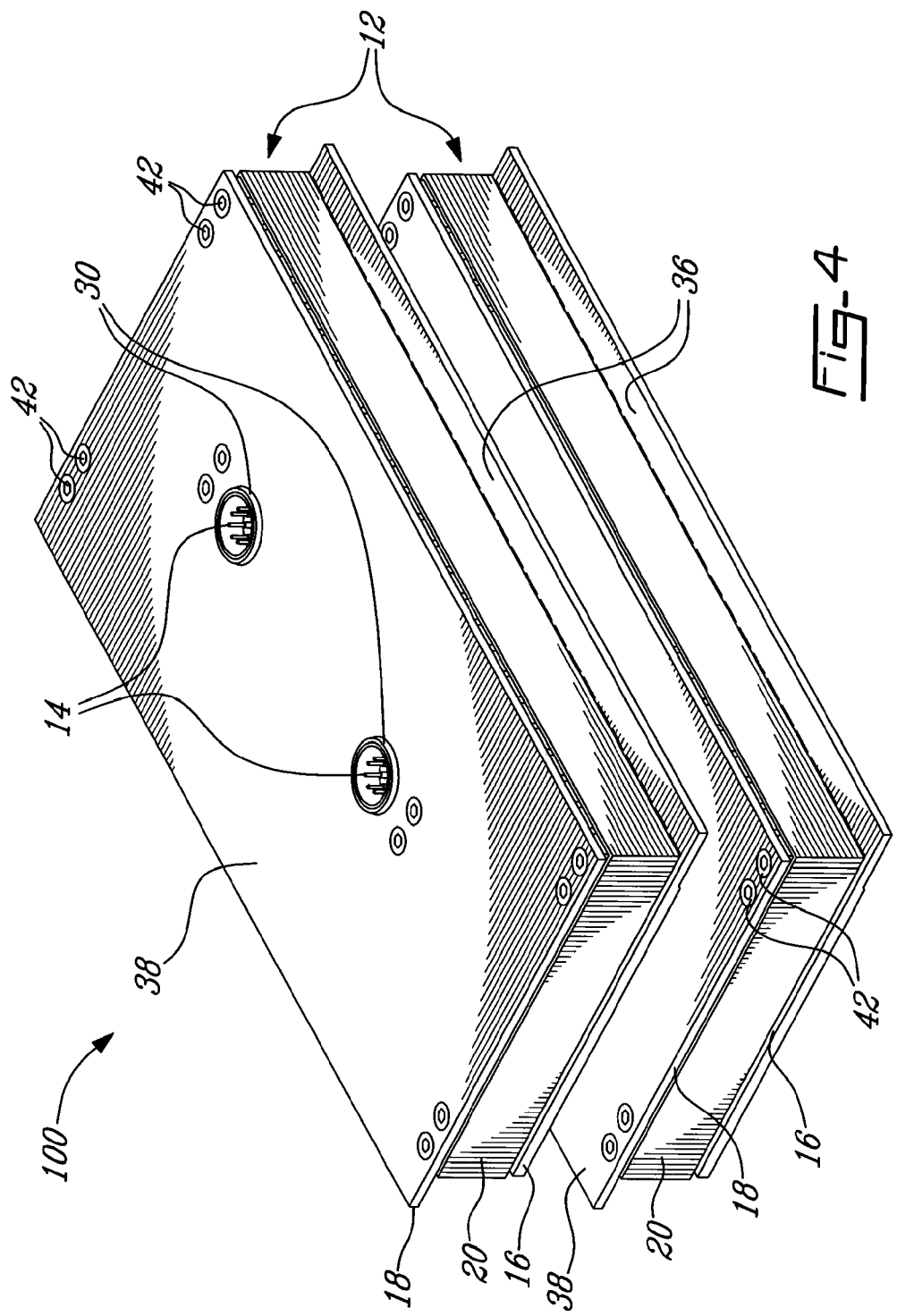
FIG. 4 is a perspective view of a capacitor installation including two capacitor assemblies in accordance with another embodiment disclosed herein.

FIG. 4 illustrates a low-inductance capacitor installation, generally shown at 100, in accordance with another exemplary embodiment of the disclosure herein. Capacitor installation 100, may comprise two or more capacitor assemblies 12 disposed relatively proximate to each other or otherwise associated with each other. For example, capacitor assemblies 12 of installation 100 may be in a stacked relationship or otherwise disposed to allow a common structure 14 through both (or more) capacitor assemblies 12. Capacitor installation(s) 100 may for example be secured to a circuit board and/or other electrical or electronic component(s). For example, capacitor assemblies 12 may each be connected to respective power buses and/or respective circuitry (not shown). Alternatively, capacitor assemblies 12 may, for example, be connected to a common power bus and/or common circuitry (not shown). Two or more capacitor assemblies 12 could be electrically coupled together in a series or a parallel configuration.

Figure 5:
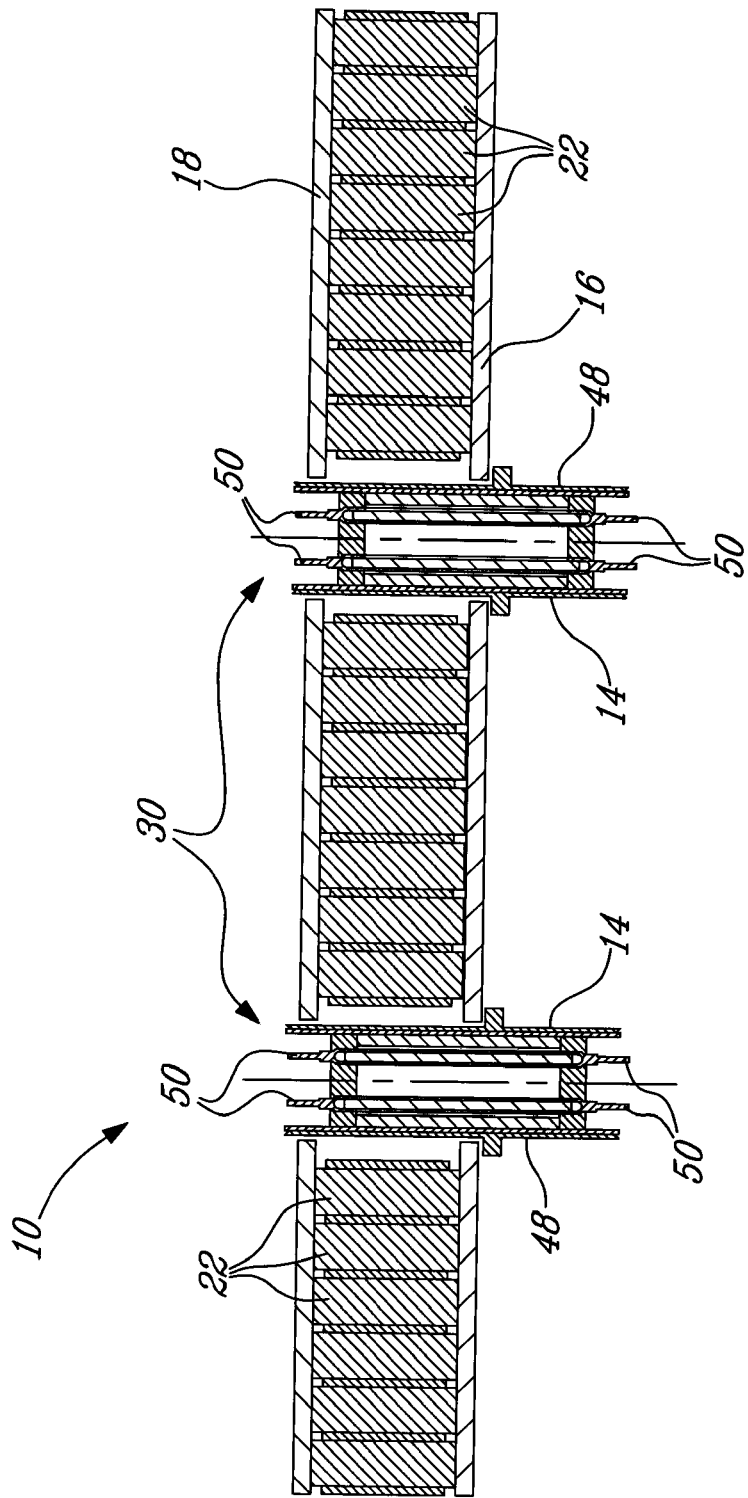
FIG. 5 is a cross-sectional view of the capacitor installation of FIG. 1 taken along line 5-5 in FIG. 1.

FIG. 5 illustrates a cross-sectional view of capacitor installation 10 of FIG. 1. Structure(s) 14 may extend through one or more passages 30 and may include a feed through connector having connector body 48 and one or more conductor pins/wires 50 disposed in connector body 48. Conductor pin(s) 50 may be used to transmit electrical signal(s) through capacitor assembly(ies) 12. Connector body(ies) 48 and pin(s) 50 may be configured to interface with other electrical/electronic component(s) (not shown) by direct connection and/or via cooperating connectors (not shown).

During assembly of capacitor assembly 12, array(s) 20 of capacitors 22 may be disposed between one or more plates 16, 18; electrically coupled to a positive terminal plate 16 and a negative terminal plate 18; and mechanically secured between plates 16, 18. An electrically conductive epoxy such as a silver-based epoxy may be used in order to electrically couple capacitors 22 to positive terminal plate 16 and/or the negative terminal plate 18. Conductive epoxy(ies) may also provide some structural support between capacitors 22 and terminal plates 16 and 18. The conductive epoxy may be applied to contact face(s) of positive terminal plate 16 and/or negative terminal plate 18 prior to disposing capacitors 22 between terminal plates 16 and 18 and also before mechanically securing terminal plates 16 and 18 together via mechanical connectors 40, if required, to form a sandwich structure. Other means of producing an electrical connection between capacitors 22 and terminal plates 16 and 18 such as soldering may also be used. The use of conductive epoxy may compensate for some dimensional variations of capacitors 22 within array 20.

Assembly of capacitor assembly(ies) 12 may be performed manually, semi-automatically or may be fully automated using suitable automation machinery/robotics. To facilitate positioning and distributing of capacitors 22 within array 20, non-conductive matrix 26 may be used to serve as a guide or template. Individual capacitors 22, such as chip capacitors for example, may be automatically positioned (e.g. inserted) within sockets 28 during an automated operation using vibrator technology. For example, capacitor(s) 22 may be disposed within such matrix(ces) 26 prior to attachment of either or both of plates 16, 18.

Void(s) 35 cooperating with respective opening(s) 32 in positive plate 16 and also with opening(s) 34 in negative plate 18 to form passage(s) 30 may be formed in array 20 by omitting at least one capacitor 22 from array 20 so as to permit the routing of cabling/conduit through array 20. Passage(s) 30 may extend through a socket 28 of matrix 26, which may be sized accordingly. Alternatively, passage(s) 30 may be formed through capacitor assembly 12 comprising a continuous array 20 of contiguously-disposed capacitor(s) 22 by drilling or other method of material removal following assembly of capacitor assembly 12.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims. Except to the extent necessary or inherent in the processes themselves, no particular order to steps or stages of methods or processes described in this disclosure is intended or implied.

What is claimed is:

1. A capacitor assembly comprising:
   a positive terminal plate and a negative terminal plate;
   an array of capacitors, the capacitors being disposed between and electrically coupled to the positive terminal plate and the negative terminal plate in parallel; and
   at least one passage extending through the positive terminal plate, the negative terminal plate and through a void formed within the array of capacitors, the void including a location where at least one capacitor is omitted from the array of capacitors.

2. The capacitor assembly as defined in claim 1, wherein the array of capacitors includes a two-dimensional array of capacitors.

3. The capacitor assembly as defined in claim 2, wherein the capacitors include chip capacitors.

4. The capacitor assembly as defined in claim 3, comprising a non-conductive matrix through which the capacitors are disposed.

5. The capacitor assembly as defined in claim 1, comprising an electrically-conductive epoxy electrically coupling at least one of the capacitors to at least one of the positive terminal plate and the negative terminal plate.

6. The capacitor assembly as defined in claim 1, comprising at least one mechanical connector secured between the positive terminal plate and the negative terminal plate.

7. The capacitor assembly as defined in claim 1, comprising a non-conductive assembly matrix through which the capacitors are disposed.

8. The capacitor assembly as defined in claim 7, comprising an electrically-conductive epoxy electrically coupling the capacitors to the positive terminal plate and the negative terminal plate.

9. The capacitor assembly as defined in claim 8, wherein the capacitors include chip capacitors.

10. The capacitor assembly as defined in claim 9, wherein the void is surrounded by capacitors within the array of capacitors.

11. A capacitor installation comprising:
    a first terminal plate having a first opening and a second terminal plate having a second opening;
    an array of capacitors, the capacitors being disposed between and electrically coupled to the first terminal plate and the second terminal plate in parallel, the array of capacitors forming a void cooperating with the first opening and the second opening to form a passage, the void including a location where at least one capacitor is omitted from the array of capacitors; and
    a conductor or other system component extending through the passage.

12. The capacitor installation as defined in claim 11, wherein the void is surrounded by capacitors within the array of capacitors.

13. The capacitor installation as defined in claim 11, comprising a non-conductive assembly matrix through which the capacitors are disposed.

14. The capacitor installation as defined in claim 11, wherein a connector extends through the passage.

15. A capacitor assembly comprising:
    a positive terminal plate and a negative terminal plate;
    a non-conductive matrix disposed between the positive plate and the negative plate, the matrix comprising a plurality of through sockets;
    a plurality of capacitors inserted in respective sockets within the matrix, the capacitors being electrically coupled to the positive terminal plate and the negative terminal plate in parallel; and
    at least one mechanical connector secured between the positive terminal plate and the negative terminal plate; the mechanical connector being inserted in one of the sockets of the matrix.

16. The capacitor assembly as defined in claim 15, comprising an electrically-conductive epoxy electrically coupling at least one of the capacitors to at least one of the positive terminal plate and the negative terminal plate.

17. The capacitor assembly as defined in claim 15, wherein the capacitors include chip capacitors.

18. The capacitor assembly as defined in claim 17, wherein the sockets are arranged in a two-dimensional array.

19. A capacitor assembly comprising:
    a positive terminal plate and a negative terminal plate;
    an array of capacitors disposed between and electrically coupled to the positive terminal plate and the negative terminal plate; and
    at least one passage extending through the positive terminal plate, the negative terminal plate and through a void formed within the array of capacitors, the void including a location where at least one capacitor is omitted from the array of capacitors.

20. A capacitor installation comprising:
    a first terminal plate having a first opening and a second terminal plate having a second opening;
    an array of capacitors disposed between and electrically coupled to the first terminal plate and the second terminal plate, the array of capacitors forming a void cooperating with the first opening and the second opening to form a passage, the void including a location where at least one capacitor is omitted from the array of capacitors; and
    a conductor or other system component extending through the passage.

21. A capacitor assembly comprising:
    a positive terminal plate and a negative terminal plate;
    a non-conductive matrix disposed between the positive plate and the negative plate, the matrix comprising a plurality of through sockets;
    a plurality of capacitors inserted in respective sockets within the matrix, the capacitors being electrically coupled to the positive terminal plate and the negative terminal plate; and
    at least one mechanical connector secured between the positive terminal plate and the negative terminal plate, the mechanical connector being inserted in one of the sockets of the matrix.

* * * * *